United States Patent

[11] 3,591,108

| [72] | Inventors | Harold Perkel<br>Levittown, Pa.;<br>William Herbert Comerford, Hightstown, N.J. |
|---|---|---|
| [21] | Appl. No. | 612,209 |
| [22] | Filed | Jan. 27, 1967 |
| [45] | Patented | July 6, 1971 |
| [73] | Assignee | RCA Corporation |

[54] CONTROL SYSTEM FOR SPINNING BODIES
3 Claims, 10 Drawing Figs.

[52] U.S. Cl. ................................................... 244/1,
74/5.5, 244/3.21
[51] Int. Cl. ............................................................... B64g 1/00
[50] Field of Search ........................................... 244/1, 3, 2,
3.21; 74/5.5

[56] References Cited
UNITED STATES PATENTS
| 3,116,035 | 12/1963 | Cutler .......................... | 244/1 (SS.) |
| 3,189,299 | 6/1965 | Garner et al ................. | 244/1 (SS.) |
| 3,362,229 | 1/1968 | Trueblood .................. | 244/1 X (SS) |
| 3,471,105 | 10/1969 | Yarber et al. ............... | 244/1 (SS) |

Primary Examiner—Milton Buchler
Assistant Examiner—Jeffrey L. Forman
Attorney—Edward J. Norton ABSTRACT: A control system for reducing undesirable motion in a spinning, orbiting satellite body is disclosed. A satellite having an angular momentum stabilizing system aboard is compensated in a manner to substantially reduce undesired motion about an axis, which may be the spin axis. A motion sensor is placed aboard the satellite to derive a signal proportional to the direction and magnitude of the undesired motion. This signal is used to rotate a flywheel, whose axis of rotation is perpendicular to the spin axis of the satellite. The flywheel is rotated either clockwise or counterclockwise depending on the signal from the motion sensor, causing the flywheel to produce an equal and opposite torque to the disturbing torque about the spacecraft's spin axis. This action damps out the undesired motion by counteracting the undesired torque.

Inventors:
HAROLD PERKEL AND
WILLIAM HERBERT COMERFORD

By Edward J. Norton
Attorney

Inventors:
HAROLD PERKEL AND
WILLIAM HERBERT COMERFORD
By Edward J. Norton
Attorney

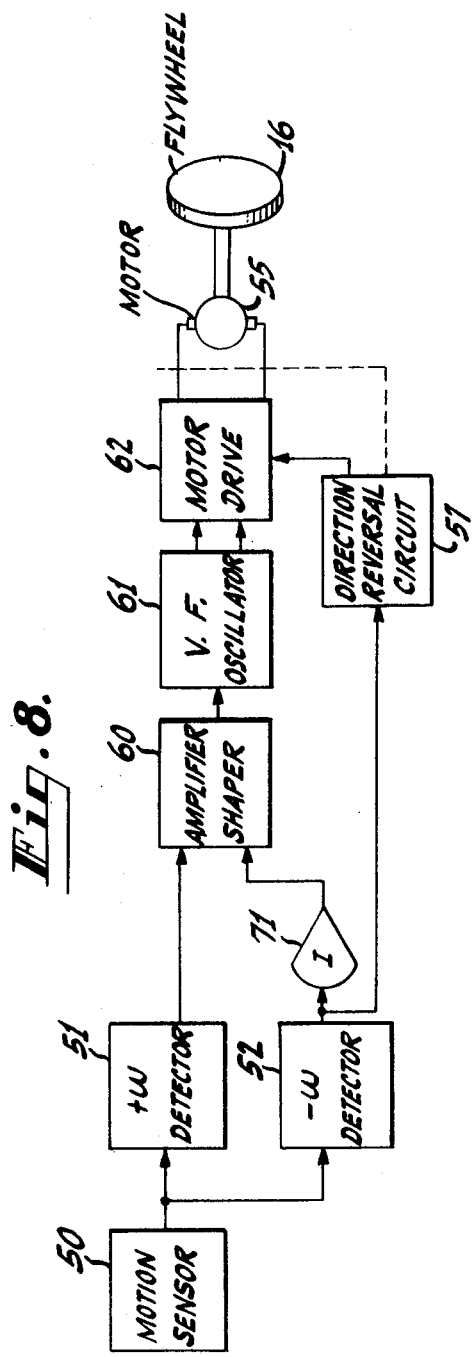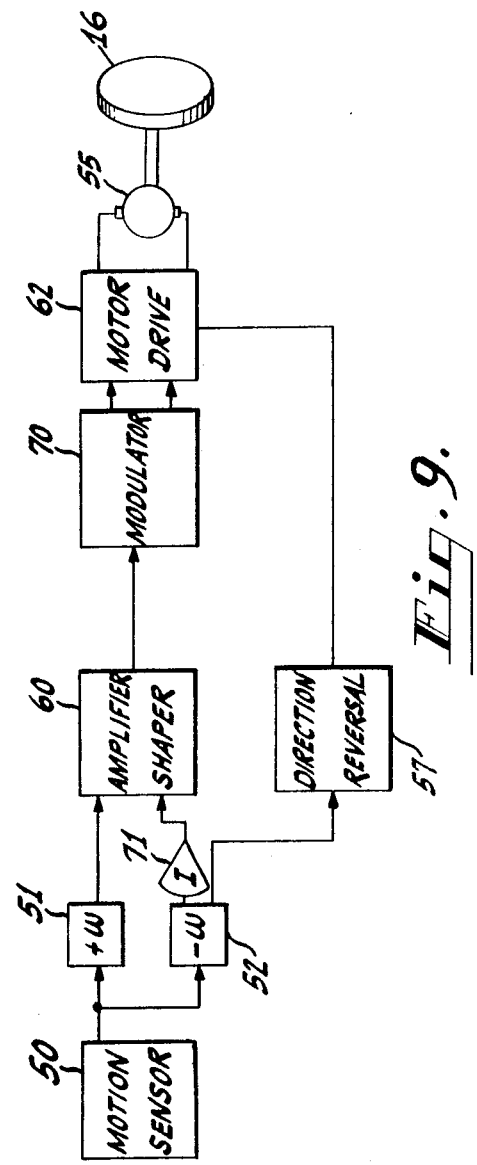

CONTROL SYSTEM FOR SPINNING BODIES

With the advent of the use of satellites as valuable tools for the compilation and transmission of data in the fields of communication, navigation, weather forecasting, and observation stations in general, it has been found that in conjunction with these varied and multiple uses a need exists to launch larger and larger satellites which can perform such multiple functions. In accordance with these developments there has also been a need to stabilize these satellites within closer tolerances and greater accuracy than has been achievable in the past.

Basically, a satellite exhibits certain types of troublesome motions. Those skilled in the art refer to such erratic or undesirable motions by various terms as wobble, precession, nutation, and so on. All of these erratic motions tend to result in a displacement of the vehicle's geometric axis from its intended mission orientation. Such undesirable motion may occur when a torque is applied to the vehicle about an axis displaced from its spin axis. However such torques may be created at launch or by rotating components in the vehicle itself. For present purposes, this troublesome motion will be referred to as nutation. Nutation may also result from an impulse or momentary torque imposed upon the satellite which torque or impulse has a component applied normal to the satellite's spin axis. The causes of nutation are many. For example, when the satellite is separated from the last stage of a launching missile, there may be undesired torques exerted about the intended mission axis which torques may result in erratic or nutational disturbances. Another nutation producing factor is that when the satellite is in orbit it may be struck by small meteoroids which also serve to disturb the energy levels of the system and cause nutation. Another nutation producing factor results from a misalignment of spacecraft mounted rockets or gas jets which are activated during the spacecraft's lifetime to perform certain control functions such as spin rate change, orbit period change, and so on. There are many other causes and effects of nutation which are known to those familiar with the state of the art. In the highly complicated and technical systems employed aboard present satellites there is a definite need for extreme stability and precise location with respect to a desired position. Hence it is extremely important that the deleterious effects of nutational motion be reduced to the fullest extent possible. However, due to the myriad of equipment necessary for present satellites to perform multiple functions, it is also desirable to keep the nutation controlling equipment as light and economical as possible.

Many solutions to the problem of damping out nutation have been suggested. Basically, one solution involves the use of energy dissipating mechanical means whereby a spring or a wire is used on which there is mounted an inertia member. The members are dimensioned so that they are subjected to the vibratory motion, dissipating mechanical energy in a manner to thereby damp out the undesired motion. Another system that has been employed utilizes a ball inertia element within a housing in a gyroscope so that the gyroscope nutation is transmitted to the ball causing it to move up and down the ball housing and exhibit oscillations at an equal frequency to the nutation, thereby damping it out. Still another prior art technique has involved the use of heavy fluids such as mercury to absorb the nutation motion. A further prior art solution is accomplished by using an unwinding flexible antenna which extends out from the spacecraft. Nutational motion of the body will cause the unwound or extended wires to oscillate thereby dissipating energy. Such dissipation will act to damp out both the nutational motion as well as higher frequency oscillation.

Each of the above enumerated prior art techniques have basic disadvantages in that some of them entail additional weight and volume, others are not accurate enough in control, and still others exhibit slow responses which result in unreasonable damping time constants. Furthermore, if passive methods are the only means used to damp out this undesired motion, then, inordinately large and heavy components must be specified to meet reasonable damping time constants. The problem of course is further aggravated in spacecrafts which have large structures attached to the central masses. These structures for example may be large antennas or large solar arrays. Such structures increase the radius of gyration of the spacecraft to such an extent that very large sources of angular momentum must be used to produce motion rates sufficiently high to permit a reasonable sized passive nutation damper to operate effectively. In any case there is needed an efficient system for damping out nutational motion on a spacecraft which relies on angular momentum for attitude stabilization.

It is therefore an object of this invention to provide an improved control system for damping out nutational motion on a spin stabilized body.

Another object is to provide an active damper for damping out nutational motion of an orbiting body in an improved manner and in minimum time.

In accordance with a first feature of the invention an angular-momentum, attitude-stabilized spacecraft is compensated to reduce the unwanted effects of nutational motion. This and other objects are accomplished by the provision of a motion sensor which may be a rate gyroscope or an accelerometer. The motion sensor is capable of delivering an electrical signal which indicates the sign and the magnitude of a component of the angular velocity along a reference axis of the spacecraft drawn through the center of mass of the spacecraft and which is perpendicular to two other axes drawn through the same point, one axis of these two being the spin axis of the spacecraft. The electrical signal is used to rotate a flywheel in the direction dictated by the sign indication specified above. For instance, if the angular velocity component is positive, the flywheel will be made to rotate clockwise. If it is negative, the flywheel is caused to rotate counterclockwise. The flywheel being a gyroscopic body has an angular momentum associated with it by virtue of its operation. Since the flywheel is attached to the spacecraft the flywheel also has the angular velocity about the reference axis as defined above. In accordance with the laws governing the motion of gyroscopic bodies, the flywheel can perform this motion only if a torque is exerted on it acting clockwise about the spin axis. Therefore, the flywheel exerts an equal and opposite torque on the spacecraft which acts counterclockwise about the spin axis. When the sign of the angular velocity changes by virtue of the nutating motion of the spacecraft, the direction of the flywheel is reversed and again a torque is exerted on the spacecraft counterclockwise about the spin axis. The cycle of operation continues uniformly locked in frequency and phase with respect to the nutation motion of the spacecraft. Thus a unidirectional torque acting on the spacecraft about the spin axis is maintained by the active nutation damper. The torque increases the angular momentum of the spacecraft along the reference axis but the total angular momentum vector of the spacecraft remains constant in inertial space since all the torques created by the nutation damper are internal to the spacecraft. The term "inertial space" or inertial frame is a space or frame which is fixed relative to the stars to be one of absolute zero motion, and hence is a space or frame which is not moving with respect to anything or a frame which has no accelerations. Therefore the spin axis of the spacecraft moves in inertial space towards the angular momentum vector of the spacecraft and therefore diminishes the angle between them. These and other objects and features, the nature of the present invention, and its various advantages will appear more fully upon consideration of specific illustrative embodiments shown in the accompanying drawing in which:

FIG. 8 is a partial block diagram and partial schematic diagram of a proportional system according to one embodiment of this invention.

FIG. 9 is a partial block diagram and partial schematic diagram of a further embodiment of a proportional system according to the invention.

Figure 1:
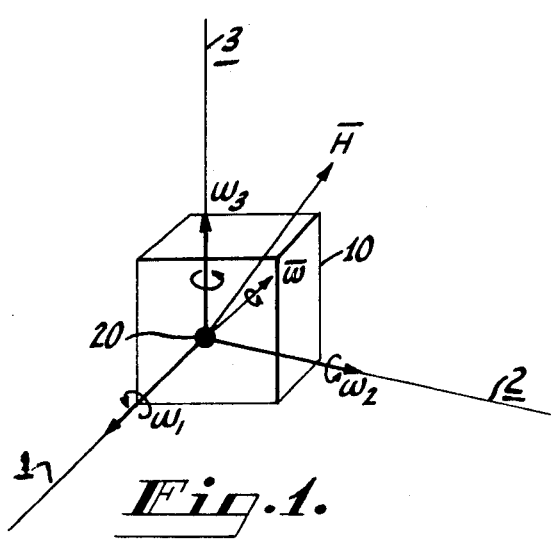
FIG. 1 is a diagrammatic view of a spacecraft showing the three axes thereof to be discussed and the momentum and velocity vectors to which reference will be made.

If reference is made to FIG. 1, there is shown a body 10 which may be a spacecraft or satellite. For the sake of simplicity, body 10 is shown in a rectangular configuration but any other shape may be utilized as well. For instance, the body 10 can be spherical, cylindrical, and so on, the important point being that the body 10 has a center of mass designated as 20. Emanating from the center of mass 20 are mutually perpendicular directions depicted as three axes which are respectively designated as the 1 axis, the 2 axis, and the 3 axis. The three axes are drawn through the spacecraft's 10 center of mass 20. The 3 axis is defined to be that direction in the spacecraft which is designed to be colinear with the total angular momentum vector $\bar{H}$ of the spacecraft 10 when the spacecraft 10 is performing its intended mission. The sign convention is that the positive 3 axis is in the positive direction of the angular momentum vector $\bar{H}$. That is, the angular momentum possessed by the spacecraft 10 is equivalent to having the body spinning counterclockwise about the 3 axis. The 1 and 2 axes are perpendicular to each other and to the 3 axis. The axes system defined above is right handed in the order 1—2—3. There are no restrictions on the choice of the 1 and 2 axes, such as mission attitude or spacecraft inertia distribution, which must be satisfied for proper functioning of the damper described herein. However, it is preferable to choose the 2 axis along the axis of maximum spacecraft inertia normal to the 3 axis.

In accordance with the basic laws of motion, the total motion of the spacecraft 10 can be resolved into two parts. The first is the motion of the center of mass 20 of the spacecraft 10, the second being the motion of the spacecraft 10 about its center of mass 20. It is the latter which is fundamental to the operation of the active nutation damper. The motion about the center of mass 20 is depicted in FIG. 1 by the vector $\bar{\omega}$. This is called the angular velocity vector. $\bar{\omega}$ is drawn through the center of mass 20 along the line about which the spacecraft is instantaneously rotated. The length of the vector $\bar{\omega}$ is proportional to the angular velocity of the spacecraft 10 about that line. The arrow head of $\bar{\omega}$ indicates that direction of rotation is counterclockwise about the line as seen looking towards the center of mass 20 from the arrow head. The curved arrow head around $\bar{\omega}$ indicates the positive convention of rotation. The angular velocity vector $\bar{\omega}$ is resolved into three components $\omega_1$, $\omega_2$, and $\omega_3$ which are the projections of $\bar{\omega}$ onto the 1, 2, and 3 axes, respectively. The total angular momentum of the spacecraft is represented by the vector $\bar{H}$ in FIG. 1. When $\bar{\omega}$, $\bar{H}$ and the 3 axis are not colinear, both the magnitude and direction of $\underline{\omega}$ in the 1—2—3 coordinate system are functions of time and the spacecraft is said to be nutating. The purpose of the active nutation damper as will be further shown is to create crosscoupling torques internal to the spacecraft in such a manner that $\bar{\omega}$ and the 3 axis are caused to converge toward colinearity with $\bar{H}$.

Figure 2:
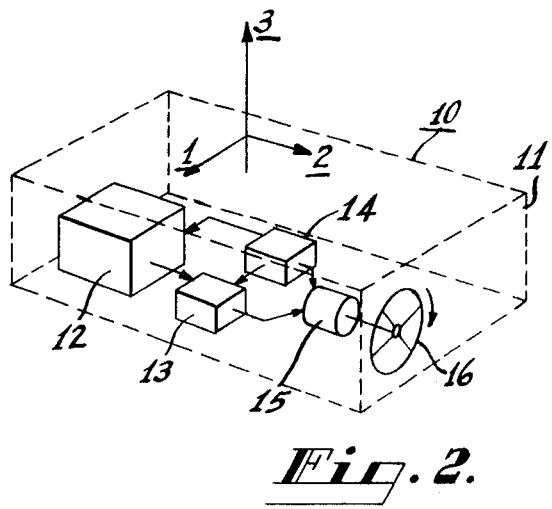
FIG. 2 is a block diagram representation of the equipment necessary according to one embodiment of the invention.

In order to accomplish this convergence the following components as shown in FIG. 2 are utilized, the dotted line 11 representing the outline of the spacecraft 10. Numeral 12 references a motion sensor. The function of the motion sensor 12 is to provide information concerning the $\omega_1$ component of the spacecraft's angular velocity which of course is proportional to the spacecraft's angular velocity $\bar{\omega}$. The motion sensor 12 generates an electrical signal which is proportional to $\omega_1$ and indicates when $\omega_1$ is positive (which is counterclockwise about the 1 axis) or negative (clockwise about the 1 axis). The motion sensor 12 can be a device which measures $\omega_1$ directly by sensing the angular velocity of the spacecraft 10 about the 1 axis or one that deduces $\omega_1$ indirectly from measurements of angular acceleration or position of the spacecraft 10 about the 2 axis such as an accelerometer. One example of such a motion sensor 12 is a conventional rate gyroscope mounted in the spacecraft 10 with the axis of momentum parallel to the 3 axis and its input axis parallel to the 1 axis. Positioned in this manner the gyroscope or motion sensor 12 would produce an electrical output proportional to $\omega_1$.

Shown coupled to the output of the motion sensor 12 is a block labeled 13. The block 13 contains electronic circuitry which circuitry performs the following logic functions. The logic of the electronic circuitry 13 must be such as to provide a signal which is related to the sign of the $\omega_1$ component of $\bar{\omega}$ by a definite convention in order to obtain proper system functioning. With the conventions defined above, namely, that the positive 3 axis is chosen to lie along the positive direction of the total angular momentum vector $\bar{H}$, the direction of the flywheel's 16 rotation with respect to the spacecraft 10 is conventionally clockwise about the 2 axis as indicated by the curved arrow next to the flywheel 16 in FIG. 2. Actually the electronics 13 can function and provide information in the following manner. Whenever the electronics 13 receives a signal indicating that the $\omega_1$ component is positive and that the signal exceeds a certain threshold, the electronics 13 will command the motor 15 to full speed in the proper direction. Whenever the output of the motion sensor 12 falls below this threshold level, the motor 15 is commanded to stop rotating. Similarly when the output of the motion sensor 12 exceeds the same magnitude of threshold but of the opposite polarity, the motor 15 is commanded to rotate the flywheel 16 at full speed in the opposite direction. If the signal from the motion sensor 12 falls below this threshold, the motor 15 is commanded to stop. As shown in FIG. 2, the motor 15 is coupled directly to the flywheel 16 and hence the flywheel 16 is driven in the direction that the motor is driven. It is also seen from FIG. 2 that the axis of rotation of the flywheel 16 is parallel to the 2 axis. The flywheel 16 may be constructed in any physical form commensurate with mechanical packaging limitations. The moment of inertia of the flywheel 16 about its axis of rotation is chosen to provide optimum damping of the expected or anticipated motion. Normally the shaping of the flywheel 16 is chosen to minimize the flywheel weight for the given size and inertia requirements imposed on it. The motor 15 is positioned in the spacecraft 10 such that the shaft of its rotor lies parallel to the 2 axis. The motor 15 is an electric motor using either alternating current (AC) or direct current (AC) excitation. The motor 15 of course is capable of having its direction of rotor rotation changed during operation. The selection of a specific motor for a given application for a nutation damper is based upon the motor performance characteristics determined by the specific needs of the application. An example of a motor type which can be used is a synchronous AC motor. Numeral 14 references the power unit in which electrical power from the power subsystem of the spacecraft 10 is converted to whatever form may be necessary, such as DC or AC, for the motion sensor 12, the electronics 13 and the motor 15. In any case power systems performing such functions are well known in the art and methods of converting AC to DC are also well known in the art and not considered part of this invention. The complete system can be activated or deactivated by conventional circuitry upon command by the power unit 14 or the electronics 13.

Figure 3:
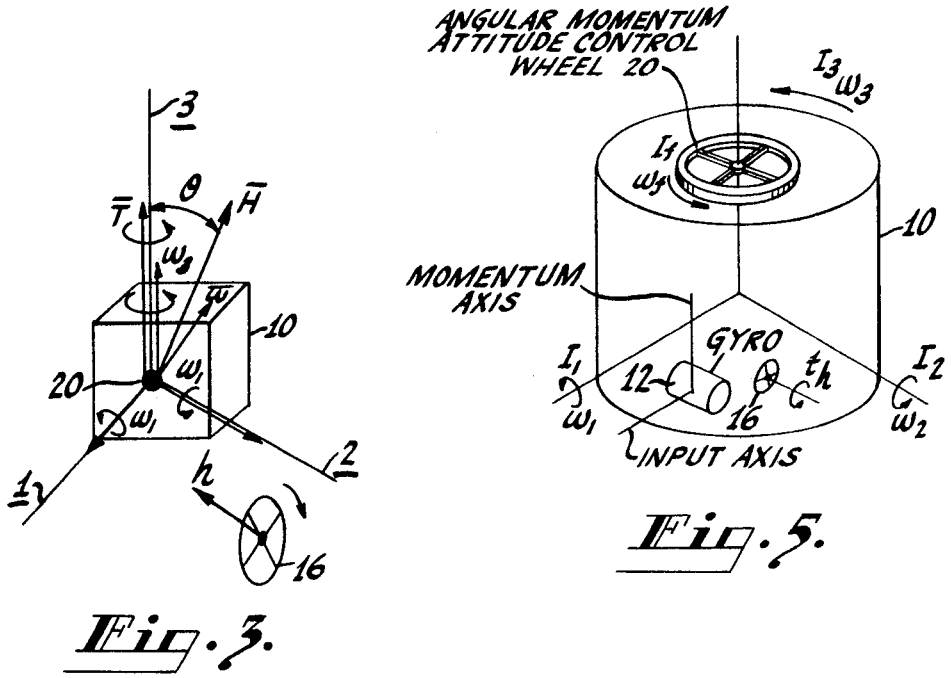
FIG. 3 is a schematic representation showing the relationships of the forces and velocities involved in the operation of this invention.

The principle of operation of the active damper will now be explained with the aid of FIG. 3. FIG. 3 shows a typical angular positioning of the 3 axis, the angular momentum vector $\bar{H}$, and the angular velocity vector $\bar{\omega}$ with respect to each other when the spacecraft 10 is nutating. The function of the active nutation damper is to reduce the angle $\theta$ drawn between the 3 axis and the $\bar{H}$ vector, and how this is done will now be explained. The nature of nutating motion is such that $\bar{\omega}$ and $\bar{H}$ trace out cones about the 3 axis in the 1—2—3 coordinate system. The $\omega_1$ and $\omega_2$ components of $\bar{\omega}$ alternate cyclically in a continuous manner between maximum positive and negative values, while the $\omega_3$ component remains nearly constant in magnitude and does not change in sign. A motion sensor as sensor 12 of FIG. 2 delivers an electrical signal to the electronics 13 indicating the sign and magnitude of $\omega_1$. Motor 15 is commanded to rotate the flywheel 16 in the direction dictated by the sign convention as specified in conjunction with FIG. 3. For the case illustrated in FIG. 2, $\omega_1$ is positive so that the flywheel 16 is made to rotate clockwise about the 2 axis as shown and indicated by the curved arrow at the circumference of flywheel 16. As was mentioned previously, the flywheel 16 being gyroscopic in nature has an angular momentum associated with it and referenced as $h$. Since the flywheel 16 is attached to the spacecraft 10, the flywheel 16 also has the angular velocity $\omega_1$ about the 1 axis. In accordance with mechanical principles, the flywheel 16 can only perform this motion if a torque is exerted on it acting clockwise around the 3 axis. Therefore the flywheel 16 can exert an equal and opposite torque on the spacecraft 10 which acts counterclockwise about the 3 axis and referenced as the vector $\bar{T}$. When the sign of $\omega_1$ changes due to the nutation motion of the spacecraft 10, the direction of the flywheel's 16 speed is reversed and again a torque $\bar{T}$ is exerted on the spacecraft 10 counterclockwise about the 1 axis. This cycle of operation continues uniformly locked in frequency and phase with respect to the nutation motion of the spacecraft 10. Thus an unidirectional torque acting on the spacecraft 10 counterclockwise about the 3 axis is maintained by the active nutation damper. The torque $\bar{T}$ increases the angular momentum of the spacecraft along the 3 axis, but the total angular momentum vector $\bar{H}$ of the spacecraft 10 remains constant in inertial space since all the torques created by the active nutation damper are internal to the spacecraft 10. Therefore, the 3 axis of the spacecraft 10 moves in inertial space towards the $\bar{H}$ vector which motion will decrease the angle $\theta$. It is to be noted that during the operation the flywheel 16 is forced to precess at the angular rate $\omega_3$ about the 3 axis also. This gives rise to an internal torque about the 1 axis. However, this torque changes sign periodically with the change in direction of flywheel speed since $\omega_3$ is unidirectional. Therefore there is essentially no net accumulation of angular impulse delivered to the spacecraft from this source. Also it is noted that the $\omega_2$ component of $\omega$ does not give rise to any torque interaction by the spacecraft 10 and the flywheel 16.

For still a clearer understanding of the operation of the active nutation damper a brief review of uncompensated momentum dynamics follows. In order to facilitate understanding and provide for a clearer description the following table defines the list of symbols used in the equations.

TABLE 1

$a$ = undetermined constant of integration (amplitude of $\omega_2$)
$h$ = angular momentum of damper flywheel (ft.-lb.-sec.)
$H$ = total angular momentum of satellite (ft.-lb.-sec.)
$H_1$ = component of H along 1 axis (ft.-lb.-sec.)
$H_2$ = component of H along 2 axis (ft.-lb.-sec.)
$H_{12} = \sqrt{H^2_1 + H^2_2}$ (ft.-lb.-sec.)
$I_1$ = inertia of satellite about 1 axis ($I_1 < I_2$) (slug-ft.$^2$)
$I_2$ = inertia of satellite about 2 axis ($I_2 > I_1$) (slug-ft.$^2$)
$I_3$ = inertia of satellite without angular momentum attitude control wheel (slug-ft.$^2$)
$I_f$ = inertia of angular momentum attitude control wheel (slug-ft.$^2$)

$$\lambda_1 = \frac{I_f \omega_f + I_3 \omega_3 - \omega_3 I_2}{I_1} \text{ (radians/sec.)}$$

$$\lambda_2 = \frac{I_f \omega_f + I_3 \omega_3 - \omega_3 I_1}{I_2} \text{ (radians/sec.)}$$

$\omega_1$ = angular velocity of satellite about 1 axis (radians/sec.)
$\omega_2$ = angular velocity of satellite about 2 axis (radians/sec.)
$\omega_3$ = angular velocity of satellite about 3 axis (radians/sec.)
$\omega_f$ = angular velocity of angular momentum attitude control wheel (radians/sec.)
$\omega_o$ = threshold setting in terms of angular velocity = radians/hour
$\psi$ = undetermined constant of integration (phase angle) (radians)

$$\dot{\psi} = \sqrt{\lambda_1 \lambda_2} \doteq \frac{H}{\sqrt{I_1 I_2}} \text{ for small } \omega_3 = \frac{\text{(radians)}}{\text{sec.}}$$

$\theta_t$ = nutation threshold angle (radians)
$\dot{\theta}$ = average rate of change of nutation angle (radians/sec.)

For small nutation angles and uncompensated momentum the equations of body motion are solved for the angular rates about the principle axis normal to an axis of angular momentum attitude stabilization. What is meant by this is that in an angular momentum attitude stabilized system which uses momentum stored in a wheel to stabilize the spacecraft the following equations can be derived for the angular rates about the principle axes normal to this stabilized wheel. The solution is $$\omega_1 = \sqrt{\frac{\lambda_1}{\lambda_2}} a \cos(\dot{\psi} t + \psi)$$

$$\omega_2 = a \sin(\dot{\psi} t + \psi) \qquad (1)$$

The frequency is given by $$\dot{\psi}^2 = \lambda_1 \lambda_2 \doteq \frac{H^2}{I_1 I_2}$$

If the uncompensated momentum $h$ lies along the 2 axis the transverse components of angular momentum are:

$$H_1 = I_1 \sqrt{\frac{\lambda_1}{\lambda_2}} a \cos(\dot{\psi} t + \psi)$$

$$H_2 = h + I_2 a \sin(\dot{\psi} t + \psi) \qquad (2)$$

A trajectory of $H_{12}$ is equal to the square root of the sum of the squares of the component of the total angular momentum of the satellite along the 1 axis and the component of the total angular momentum of the satellite along the 2 axis. The angular momentum component in the (1,2) plane is obtained by eliminating time from the above equations.

$$\frac{H_1^2}{\left(I_1 \sqrt{\frac{\lambda_1}{\lambda_2}} a\right)^2} + \frac{(H_2 - h)^2}{(I_2 a)^2} = 1 \qquad (3)$$

Figure 4:
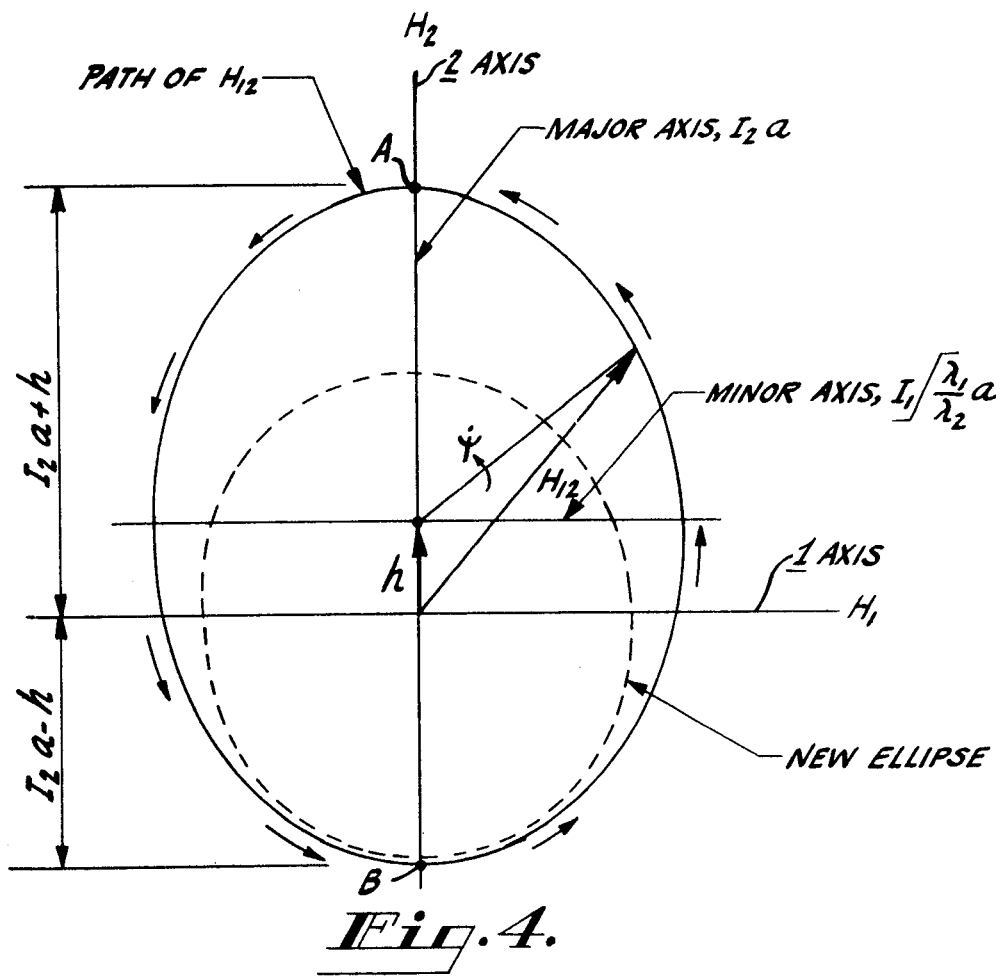
FIG. 4 is a trajectory of the angular momentum of a spacecraft when a compensated momentum lies along the particular axis.

If $H_1$ is put on the 1 axis and $H_2$ on the 2 axis as seen in FIG. 4 it is seen that the trajectory is an ellipse with the center at $(0, h)$ and having major and minor axes of lengths $I_2 a$ and $$I_1 \sqrt{\frac{\lambda_1}{\lambda_2}} a.$$

If $h$ is constant, the ellipse is traced out at a constant angular rate $\dot{\psi}$ relative to the center of the ellipse. $H_{12}$ varies between a maximum of $I_2 a + h$ at point A and a minimum of $I_2 a - h$ at the point B, and it is at these extremes that the total angular momentum vector is either farthest from or closest to the spin axis. If $h$ is instantaneously reduced to 0 when $H_{12}$ arrives at B, a new trajectory begins with this position as the initial condition. The new ellipse has its center at the origin. It is exactly the same shape as before since the ratio of major to minor axis is $$\frac{I_2}{I_1} \sqrt{\frac{\lambda_2}{\lambda_1}}$$

but it is smaller in size. The new ellipse is shown in FIG. 4 by the dashed line referenced as the new ellipse. The active damper described above reverses the direction of $h$ periodically at the proper phasing so that $H_{12}$ is caused to trace out a family of ever decreasing ellipses.

Figure 5:
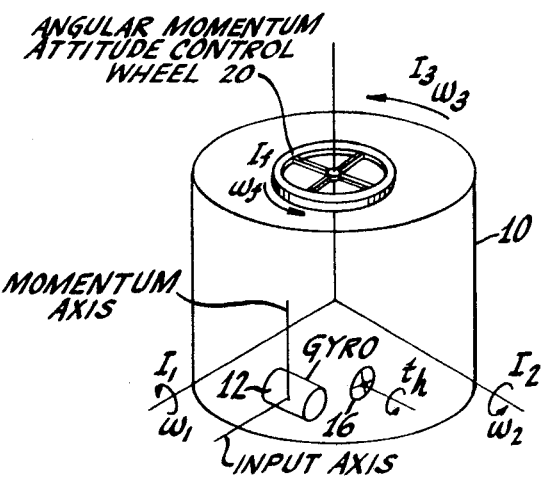
FIG. 5 is a diagram of the installation of the active damper parts according to one embodiment of the invention.
Figure 6A:
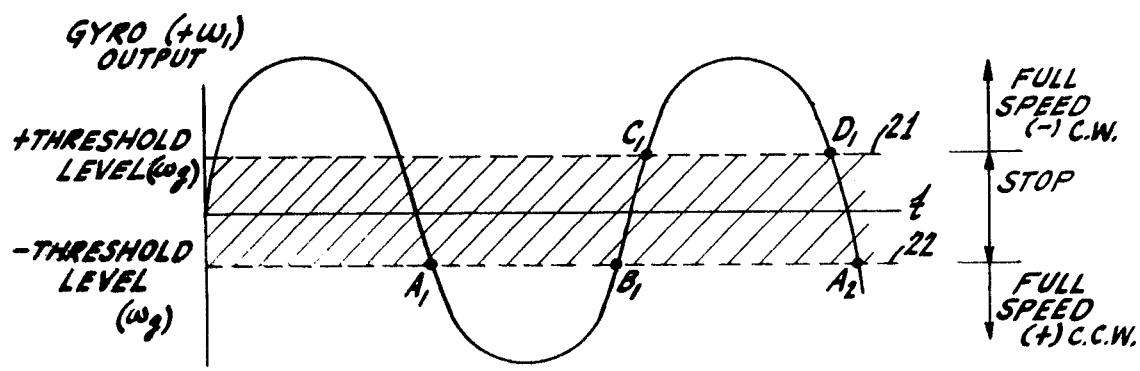
FIG. 6a is a curve showing the output of a gyro with respect to time according to the teachings of this invention.

If reference now is made to FIG. 5, the damping flywheel 16 is aligned with the axis of maximum inertia perpendicular to the axis of the angular momentum attitude control wheel 20 which forms a part of the spacecraft or satellite 10. The flywheel 16 runs at full speed in one direction for somewhat less than a half of a period given by $2\pi/\dot{\psi}$ seconds and then stops. Then it runs at full speed in the opposite direction for the same time and stops again. Each complete cycle has a period of $2\pi/\dot{\psi}$ seconds. Also shown in FIG. 5 is the gyroscopic motion sensor 12 which is mounted in the spacecraft 10 such that its output is proportional to the angular velocity of the satellite 10 about the axis mutually perpendicular to the axis of the damper wheel 16 and the control wheel 20. Thus, the input axis of gyroscope 12 is parallel to the satellite axis of minimum inertia transverse to the axis of the attitude control wheel 20. This orientation is chosen since the amplitude of angular velocity about this axis is greater than about the other transverse axis. The momentum vector of the gyroscope 12 is parallel to the axis of the control wheel 20. If reference is now made to FIG. 6a there is shown the electrical output of the gyroscope which is a sinusoidal function essentially proportional to and in phase with $\omega_1$. Positive and negative thresholds are chosen. When the gyroscope's output is greater than the threshold level the damper wheel 16 is driven full speed in the direction indicated by the sign of the gyro output. Hence for the crosshatched area shown in FIG. 6a the motor and therefore the flywheel is not rotating, while in the area above line 21 referenced as the positive threshold level the motor is driven at full speed clockwise. For signals below the negative threshold level indicated as dashed line 22 the motor is driven at full speed counterclockwise. Thus the momentum of the damper flywheel 16 is an alternating square wave with short intervals of zero level separating the squares.

Figure 6:
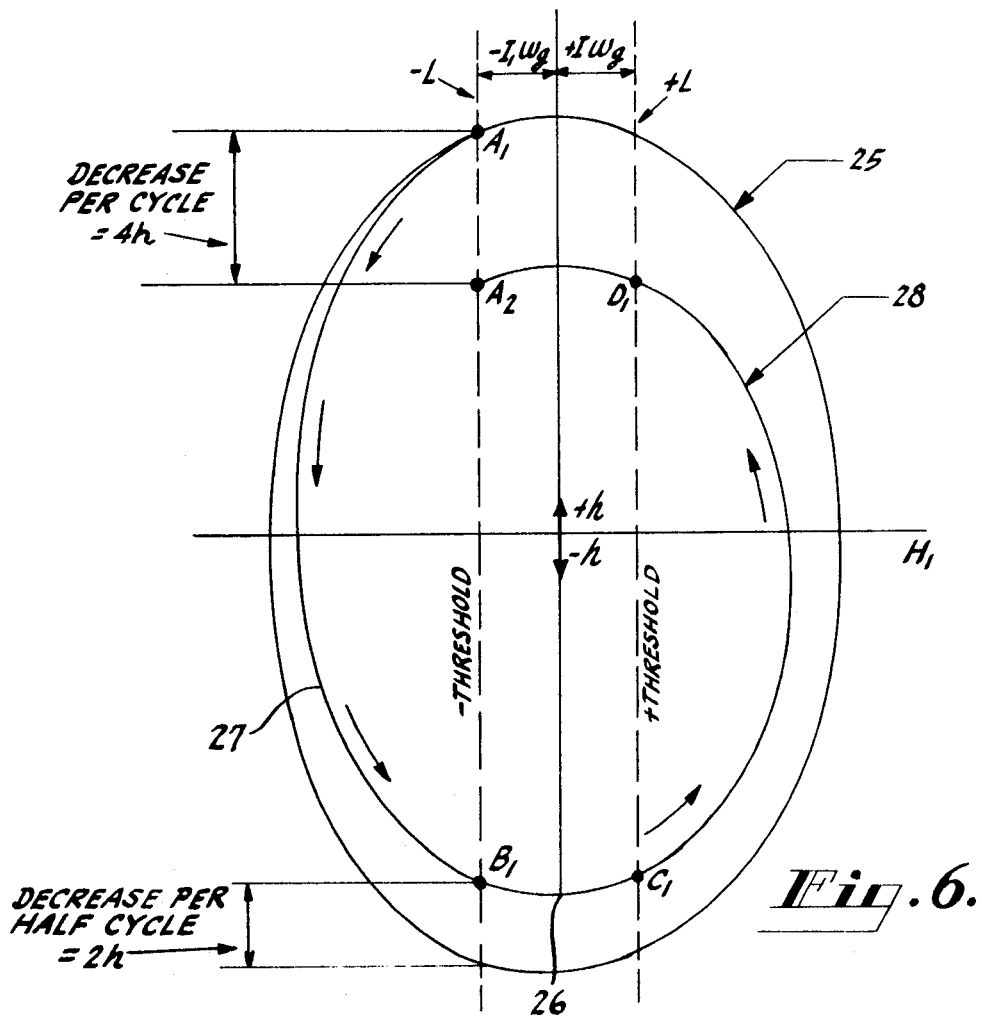
FIG. 6 is a trajectory of the angular momentum of a spacecraft for one cycle of damping.

If reference is now made to FIG. 6 there is shown a trajectory of $H_{12}$ during nutation damping. Before the damping system is active, $H_{12}$ traces out the large outer ellipse 25 counterclockwise. Assume the damper flywheel 16 is activated when $H_{12}$ reaches point $A_1$, $\omega_1$ is above the threshold and the damper wheel is driven at full speed counterclockwise about the 2 axis since $\omega_1$ is negative in value. $H_{12}$ then travels along the ellipse 27 having center at $(0,+h)$ until it reaches point $B_1$ where the damper wheel is turned off since $\omega_1$ drops below threshold. $H_{12}$ coasts from $B_1$ to $C_1$ on an ellipse 26 having its center at the origin. When $H_{12}$ reaches $C_1$ the damper flywheel 16 is driven clockwise about the 2 axis causing $H_{12}$ to follow the ellipse 28 with a center at $(0, -h)$ to the point $D_1$. The damper wheel 16 is stopped again while $H_{12}$ coasts from $D_1$ to $A_2$ completing one full damping cycle. The reduction of $H_{12}$ is $4h$ every cycle as measured along the threshold line. Thus the damping rate in terms of nutation angle is $$\theta = \frac{\Delta\theta}{\Delta t} = \frac{\sin^{-1}\frac{4h}{H}}{2\pi/\dot{\psi}} \doteq \frac{2}{\pi}\frac{h}{\sqrt{I_1 I_2}} \quad (4)$$

If the analysis of damping is carried further it can be shown that the damping trajectories degenerate as soon as either of the points $B_1$ or $A_2$ of FIG. 6 fall closer to the 1 axis than the distance $h$. The damper wheel momentum, $h$, and the gyroscope output threshold level which we now define as $\omega_o$ is chosen such that the following relation is observed:

$$h^2 + I_1 I_2 \omega_o^2 = A k_t^2 H^2 \quad (5)$$

With this choice the damping trajectories cannot degenerate until the maximum nutation angle is less than the threshold requirement $\theta_t$. Hence it is possible by the use of the preceding equation to obtain a three way trade off between system momentum ($H$) threshold setting ($\omega_o$) and damper flywheel momentum ($h$).

Figure 7:
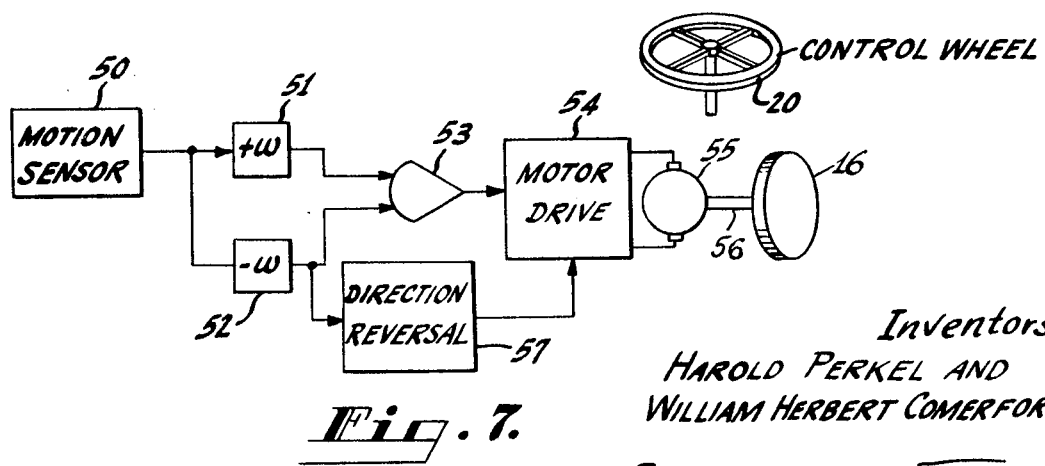
FIG. 7 is a block diagram of one embodiment of this invention.

If reference is made to FIG. 7, there is shown a partial block diagram of a system capable of operating according to this invention and hence performing nutation damping. Numeral 50 refers to the motion sensor as described above. This motion sensor 50 may be a gyroscope or an accelerometer. The motion sensor 50 does not actually have to measure the rate of angular velocity of the satellite about the axis that is mutually perpendicular to the axis of a control wheel and the axis of the nutation flywheel. In fact all the motion sensor 50 has to do is to merely sense the direction of this rotation. Miniaturized gyroscopes can be used as there are gyroscopes available which can sense extremely low rates. For example Reeves Instruments makes two such gyros, the D30S which is a 0.1° per hour gyro and the ZERO-ONE which is a 0.01° gyro weighing less than 0.6 of a pound. Power and weight consuming heaters are not needed since rate accuracy is not necessary. The output from the gyroscope or motion sensor 50 is coupled to two electronic circuits labeled $+\omega$ and $-\omega$ and referenced as 51 and 52 respectively. The function of circuit 51 is to produce a signal which indicates that the output of the gyroscope is in the positive angular velocity direction and is of a sufficient magnitude to exceed the threshold level. Conversely the function of the circuit 52 is to produce a signal when the output of the motion sensor 50 is in the opposite angular velocity direction and also exceeds the negative threshold. Circuits 51 and 52 can be conventional Schmitt trigger circuits. A Schmitt trigger will produce an output pulse when the input exceeds a critical value determined by the attenuating circuit coupling the active devices, as tubes or transistors, utilized in the Schmitt trigger and also dependent upon the voltage at a common tie in point in the Schmitt trigger. There are many other examples of circuits which can be used to perform the logic operation of producing an output for a specified input. Other examples of such circuits which can be used for the circuits 51 and 52 are blocking oscillators and bridge circuits. The outputs of both circuits 51 and 52 may be coupled to an amplifier circuit 53 which serves to produce a sufficient amount of power for coupling to a motor drive circuit 54. The motor drive circuit 54 is utilized to drive the motor 55 in the desired direction determined by which one of the circuits 51 or 52 is energized. As way previously mentioned the motor may be either an AC or DC motor operated by the motor drive circuit 54 by conventional techniques. The rotor of motor 55 is coupled to the flywheel 16 via a suitable shaft or mechanical link 56. Hence the flywheel 16 is driven in the same direction that the motor 55 is driven. Circuits for driving AC or DC motors are well known in the art and are not considered part of this invention. Also shown coupled to the output of circuit 52 is a direction reversal circuit designated as 57. The output of circuit 57 is shown coupled to an input of the motor drive circuit 54. The function of the direction reversal circuit 57 is to indicate to the motor drive circuit 54 that the direction of rotation of the motor is to be reversed. The circuit 57 may be a simple relay arrangement which serves to switch the armature and field leads of motor 55 to obtain a reversal in direction or it may be a diode bridge circuit or a silicon controlled rectifier circuit or merely a switching circuit which changes the polarity of the voltage going to the motor 55 and hence effects a change in direction. It is of course obvious that the direction reversal circuit 57 can be coupled to circuit 51 instead of circuit 52 with the operation being opposite to that described for FIG. 7. It is also noted that the circuit shown in FIG. 7 is one that is referenced in conventional terminology as a bang-bang circuit. Bang-bang circuits as compared to proportional circuits are circuits that function by turning something completely on or completely off. The circuit depicted in FIG. 7 is bang-bang because the motor 55 exhibits three conditions of operation which are 1. full speed in the clockwise direction or
2. full speed in the counterclockwise direction or
3. completely off.

The above three conditions of course correspond to the output of the motion sensor or gyroscope 50 as follows:

1. exceeding the positive threshold level
2. exceeding the negative threshold level or
3. in-between the positive and negative threshold levels.

A synchronous AC motor can be utilized for 55 and this is particularly suitable for driving the flywheel damper 16 since it reaches full speed quickly and has not brushes. Also high running speeds permit the use of a small low weight flywheel since its momentum that we are concerned with. The 15 H1 series motor produced by Servo Mechanics Inc. have the appropriate characteristics for this operation.

If reference is made to FIG. 8 there is shown a proportional type nutation damping system. For the sake of clarity identical components have been referenced with identical numerals. There is shown the motion sensor 50 whose output is coupled to a +ω detector and −ω detector 51 and 52 which operate in the same manner as those described in conjunction with FIG. 7. In this case, however, the output of the +ω detector 51 is coupled to an amplifier shaper circuit 60. The amplifier shaper 70 functions to produce a signal at its output which is proportional to the magnitude of the angular velocity. For the case of a proportional controller the amplifier shaper 60 could also be biased so that it starts to operate at some predetermined threshold level. The −ω detector 52 is coupled to an inverting amplifier 71 whose output is also coupled to an input of the amplifier shaper circuit 60. Hence the output of the amplifier shaper circuit 60 gives a signal which is proportional to the magnitude of the angular velocity of nutation. As in the case described in conjunction with FIG. 7 the amplifier shaper's 60 output is a function of the magnitude of the sense of direction of angular velocity. The output of the amplifier shaper 60 can then be used to modulate a variable frequency oscillator 61 which is coupled to a motor drive circuit 62 to vary the speed and direction of a synchronous motor 55 whose rotor is mechanically coupled to a flywheel 16. The function of the motor and its speed and direction determines, as described previously, the compensating torques produced to reduce nutational motion about a desired axis of the satellite. As was the case in FIG. 7 the output of the −ω detector 52 is also coupled to a direction reversal circuit 57 whose function is to indicate to the motor drive system that the motor is to be reversed in direction. There is also shown a dashed line emanating from the direction reversal circuit 57 and crossing the two leads that couple the motor 55 to the motor drive circuit 62. This is shown to further point out that the reversal circuit can be a simple, electrically operated switch or perhaps a mechanical device. There are many circuits for changing the direction of rotation of a motor known to those skilled in the art and for all practical purposes anyone of these circuits could be utilized.

FIG. 9 shows a similar configuration to that of FIG. 8, serving to afford proportional control of a nutation system using a DC motor instead of an AC motor. Hence the output of the amplifier shaper 60 is coupled directly to a modulator circuit 70 whose output feeds a motor drive circuit 62. In the case of a DC motor there is no need for the variable frequency oscillator 61 of FIG. 8 and the function of the modulator and motor drive in this case would be to provide a signal to the motor 55 which is proportional to the sense and rate of change of the nutation angular velocity component. The other components of the system perform the identical functions as described above in conjunction with FIGS. 7 and 8.

Finally, the use of the active nutation damper system leads to considerable savings in three ways. Due to the low threshold sensitivity of the gyroscope or motion sensor, the angular momentum of the flywheel can be greatly reduced. This permits reduction of the angular momentum control wheels' weight, size or speed. Secondly, the active damper weighs much less than a passive one and has a more compact form. And finally, the nutation damping is much more rapid with the active device.

Some typical advantages can be tabulated. Assume the nutation threshold requirement of a large satellite is $\theta_r=0.05°$. For a large satellite assume the $\sqrt{I_1 I_2} \cong 3,050$ slug$-$ft$^2$, and further assume that $\omega_o$ is chosen to be $2°/M$. Then if a nutation damping rate of $\dot\theta = 2°/hr.$ is desired, the momentum of the damper flywheel is determined from equation 4 to be .56 m.-lb.-sec. Equations 4 and 5 shows that the system momentum $H$ should be chosen at $H=63$ ft.$-$pounds$-$sec. Assuming a synchronous motor speed of 12,000 r.p.m. and a flywheel radius of gyration of 1 inch the damper flywheel weighs less than 0.2 pounds. A passive damper would weight more than 35 pounds, be 6 feet in diameter and still have a damping time greater than the active damper.

What we claim is:

1. An active nutation damper for use on a spacecraft of the type having an angular momentum attitude stabilized wheel comprising in combination,
   a. a motion sensor having its momentum axis parallel to the axis of said attitude stabilized wheel, said sensor being mounted with said spacecraft to produce a signal related to the nutation motion of said spacecraft about an axis perpendicular to said attitude stabilized axis,
   b. a flywheel rotatably mounted within said spacecraft on an axis perpendicular to said attitude stabilized axis,
   c. first means responsive to said signal to provide a second signal related to the direction of said nutation motion,
   d. second means coupled to said first means and to said flywheel and responsive to said second signal for driving said flywheel in a direction dependent on the direction of said nutation motion to produce a torque about said stabilized axis to decrease said nutation motion whatever be the direction of said motion, wherein
   said first means is a first and second threshholding device,
   said first device being designed to trigger when said nutation motion is in the positive direction and said second device being designed to trigger when said nutation motion is in the negative directions,
   means for connecting said second means to said first and second devices to operate said flywheel in response to the triggering of said devices to produce said torque.

2. An active nutation damper for a spinning spacecraft, comprising,
   a. a motion sensor within said spacecraft and mounted to provide a signal related to the sense of nutation motion of said spacecraft in a plane perpendicular to said spin axis,
   b. a first threshold device coupled to said sensor to produce a first output when said signal indicates a positive sense of nutation,
   c. a second threshold device coupled to said sensor to produce a second output when said signal indicates a negative sense of nutation,
   d. first means coupled to said first and second threshold devices to provide a composite control signal derived from said first and second outputs,
   e. a flywheel rotatably mounted within said spacecraft and having its axis of rotation perpendicular to said spin axis and parallel to said plane,
   f. driving means, including a motor, coupled between said first means and said flywheel and responsive to said composite signal to drive said flywheel in either of two directions determined by said composite signal to produce a torque about said spin axis reducing said nutation motion.

3. An active nutation damper for a spin stabilized spacecraft, comprising,
   a. a motion sensor within said spacecraft and mounted to provide a signal related to the sense of nutation motion of said spacecraft in a plane perpendicular to said spin axis,
   b. a first threshold device coupled to said sensor to produce a first output when said signal indicates one direction of nutation,
   c. a second threshold device coupled to said sensor to produce a second output when said signal indicates a different direction of nutation,
   d. first means coupled to said first and second threshold devices to provide a composite control signal derived from said first and second outputs,
   e. a flywheel rotatably mounted within said spacecraft and having its axis of rotation perpendicular to said spin axis and parallel to said plane,
   f. driving means coupled between said first means and said flywheel and responsive to said composite signal to drive said flywheel according to the magnitude of said composite signal, said driving means further disposed to be always responsive to said composite signal's portion due to said first one threshold circuit to reduce said nutation motion in said one direction.

g. direction reversal means coupled to said driving means and said second threshold device to cause said driving means to reverse the direction of said flywheel when said second threshold device produces its output enabling said driving means to be responsive to that portion of said composite signal due to said second threshold output devices to reduce said nutation motion in said negative sense of direction.